United States Patent
Komori

(10) Patent No.: US 9,759,254 B2
(45) Date of Patent: Sep. 12, 2017

(54) WHEEL BEARING APPARATUS

(71) Applicant: NTN Corporation, Osaka-shi (JP)

(72) Inventor: Kazuo Komori, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 13/680,235

(22) Filed: Nov. 19, 2012

(65) Prior Publication Data

US 2013/0077909 A1 Mar. 28, 2013

Related U.S. Application Data

(63) Continuation of application No. PCT/JP2011/061557, filed on May 19, 2011.

(30) Foreign Application Priority Data

May 20, 2010 (JP) ................. 2010-115965

(51) Int. Cl.
  *F16C 13/00* (2006.01)
  *F16C 19/08* (2006.01)
  (Continued)

(52) U.S. Cl.
  CPC .............. *F16C 19/08* (2013.01); *B60B 35/18* (2013.01); *F16C 19/184* (2013.01); *F16C 33/585* (2013.01); *F16C 33/64* (2013.01); *B60B 2310/234* (2013.01); *B60B 2380/12* (2013.01); *B60B 2380/73* (2013.01); *B60B 2380/75* (2013.01); *B60B 2900/133* (2013.01);
  (Continued)

(58) Field of Classification Search
  CPC ..... B60B 27/00; B60B 35/18; B60B 2380/12; B60B 2380/73; B60B 2380/75; B60B 2900/131; B60B 2900/133; F16C 19/08; F16C 19/184–19/187; F16C 33/583; F16C 2240/80; F16C 2326/02
  USPC ......................... 384/492, 513, 515, 516, 544
  See application file for complete search history.

(56) References Cited

U.S. PATENT DOCUMENTS 5,051,004 A * 9/1991 Takeuchi et al. .............. 384/516
7,648,283 B2 * 1/2010 Komori ......................... 384/513
(Continued)

FOREIGN PATENT DOCUMENTS

EP  1 947 355   7/2008
JP  2004-052784  2/2004
(Continued)

*Primary Examiner* — James Pilkington
(74) *Attorney, Agent, or Firm* — Harness, Dickey & Pierce, P.L.C.

(57) ABSTRACT

A wheel bearing apparatus has a double row angular contact ball bearing. A height of a shoulder of a shoulder portion (18) of an outer member (12) with respect to a ball diameter of a double ball (14) row is set in a range of 0.35 to 0.50 mm. A corner (19) of the shoulder portion (18) has a relief surface (19a) and a chamfered portion (19b). The relief surface is on a straight line that is on a tangent line of an outer raceway surface (12a). The chamfered portion (19b) is round in a circular arc with a predetermined radius of curvature r. The corner (19) is formed simultaneously by a formed grinding wheel forming the double row outer raceway surface (12a). The corner is formed smoothly continuous from each outer raceway surface (12a). A length in the radial direction of the relief surface (19a) is set greater than or equal to 0.2 mm.

9 Claims, 6 Drawing Sheets

(51) Int. Cl.
    *B60B 35/18*     (2006.01)
    *F16C 19/18*     (2006.01)
    *F16C 33/58*     (2006.01)
    *F16C 33/64*     (2006.01)
    *F16C 23/04*     (2006.01)

(52) U.S. Cl.
    CPC ....... *B60B 2900/321* (2013.01); *F16C 23/041* (2013.01); *F16C 2240/30* (2013.01); *F16C 2240/34* (2013.01); *F16C 2240/80* (2013.01); *F16C 2326/02* (2013.01)

(56) References Cited

U.S. PATENT DOCUMENTS

| | | | |
|---|---|---|---|
| 7,832,942 B2 * | 11/2010 | Komori et al. | 384/544 |
| 7,862,242 B2 * | 1/2011 | Ohtsuki | 384/544 |
| 7,901,143 B2 * | 3/2011 | Hattori et al. | 384/544 |
| 8,376,625 B2 * | 2/2013 | Wakabayashi | 384/544 |
| 2007/0098315 A1 * | 5/2007 | Komori et al. | 384/544 |
| 2009/0052823 A1 | 2/2009 | Komori et al. | |

FOREIGN PATENT DOCUMENTS

| | | |
|---|---|---|
| JP | 2007-085555 | 4/2007 |
| JP | 2007-292198 | 11/2007 |
| JP | 2008-256071 | 10/2008 |
| JP | 2009-162335 | 7/2009 |

\* cited by examiner

[Fig 1]
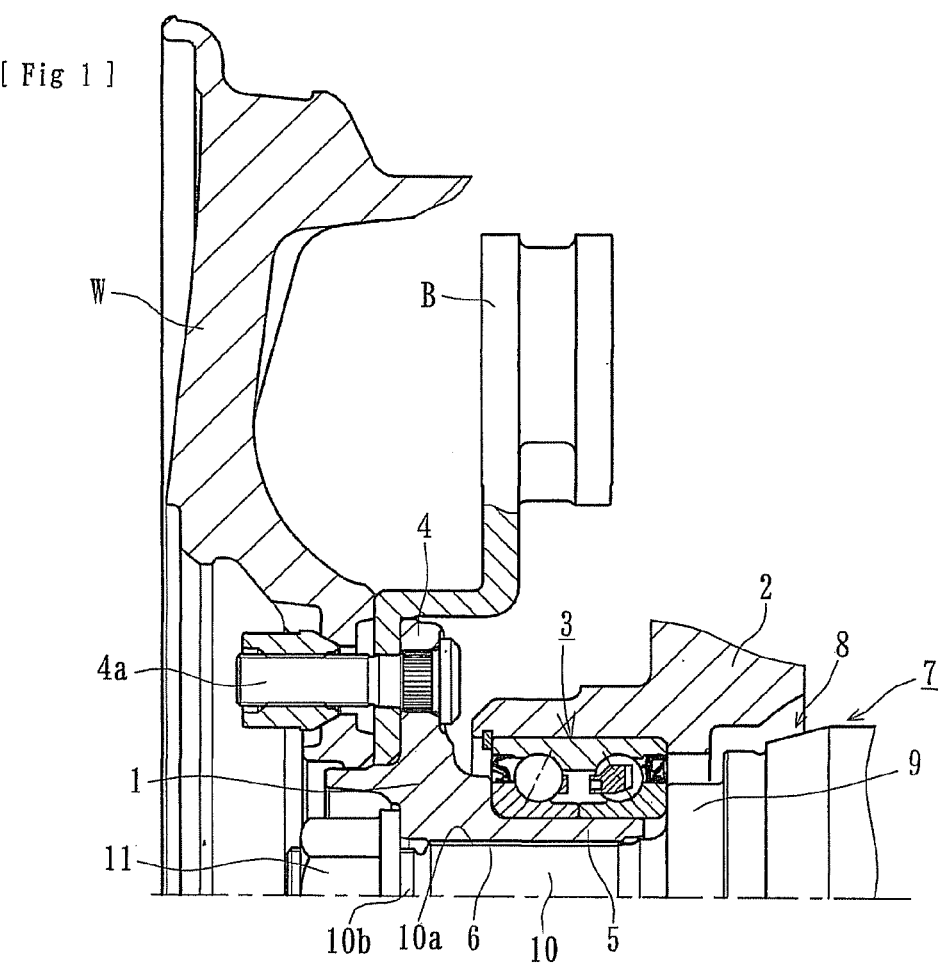
[Fig 2]
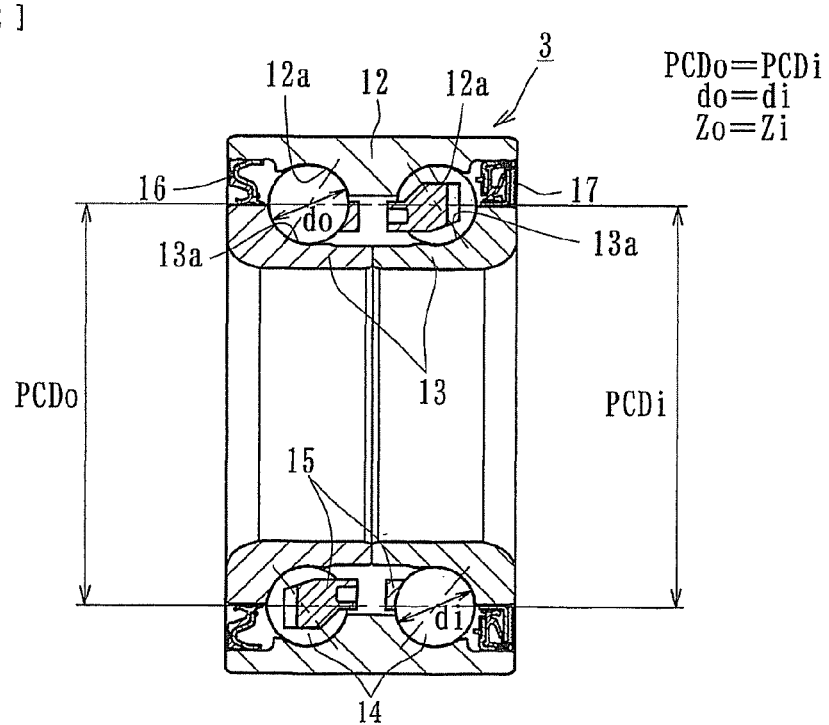

[Fig 3]
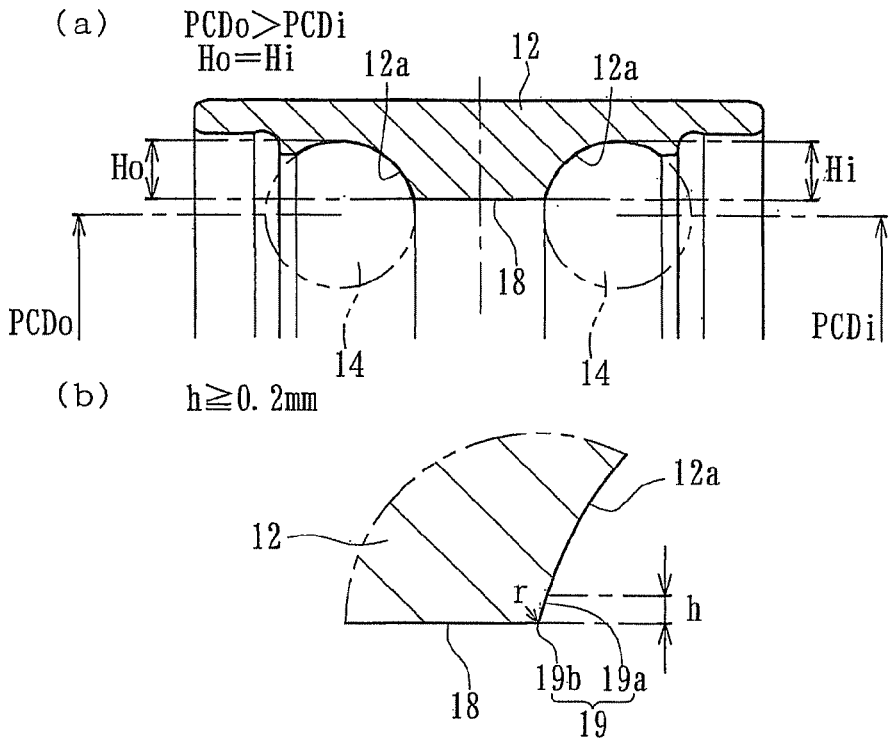
[Fig 4]
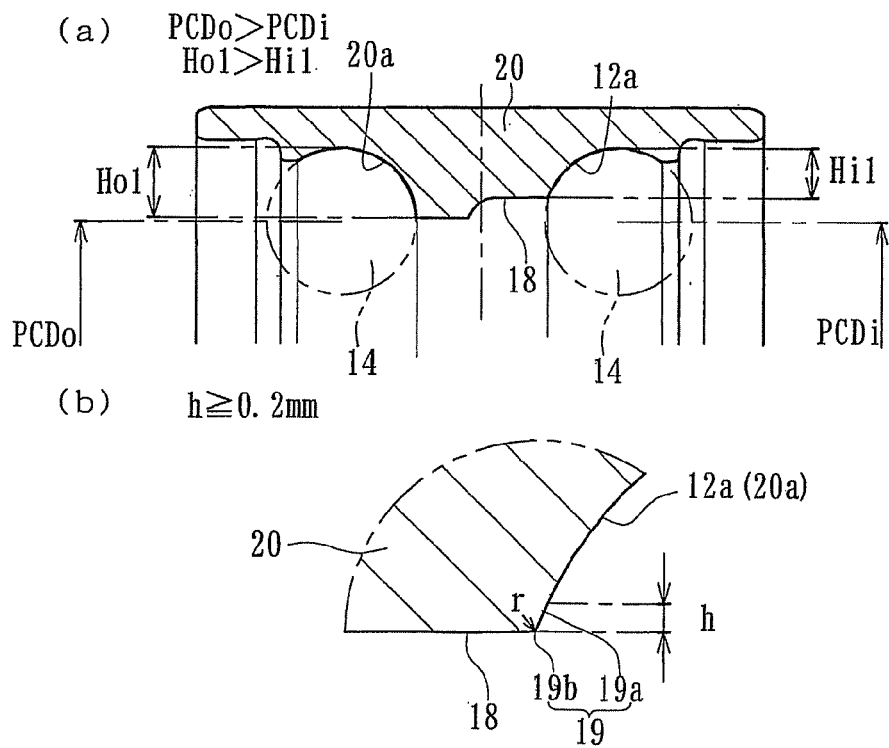

[Fig 5]
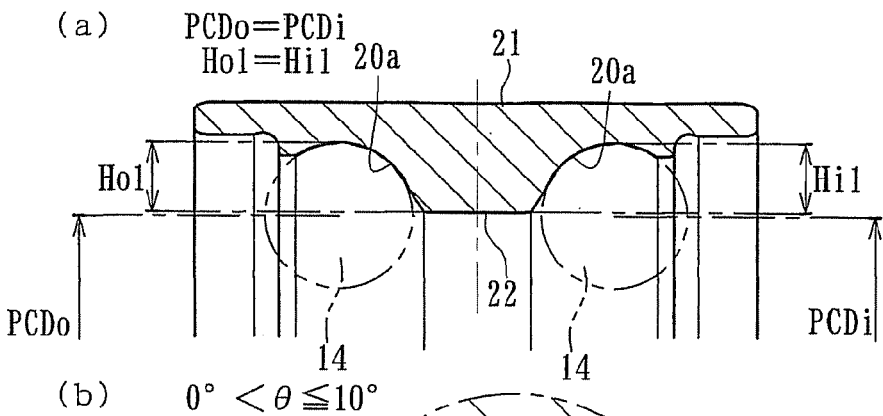
[Fig 6]
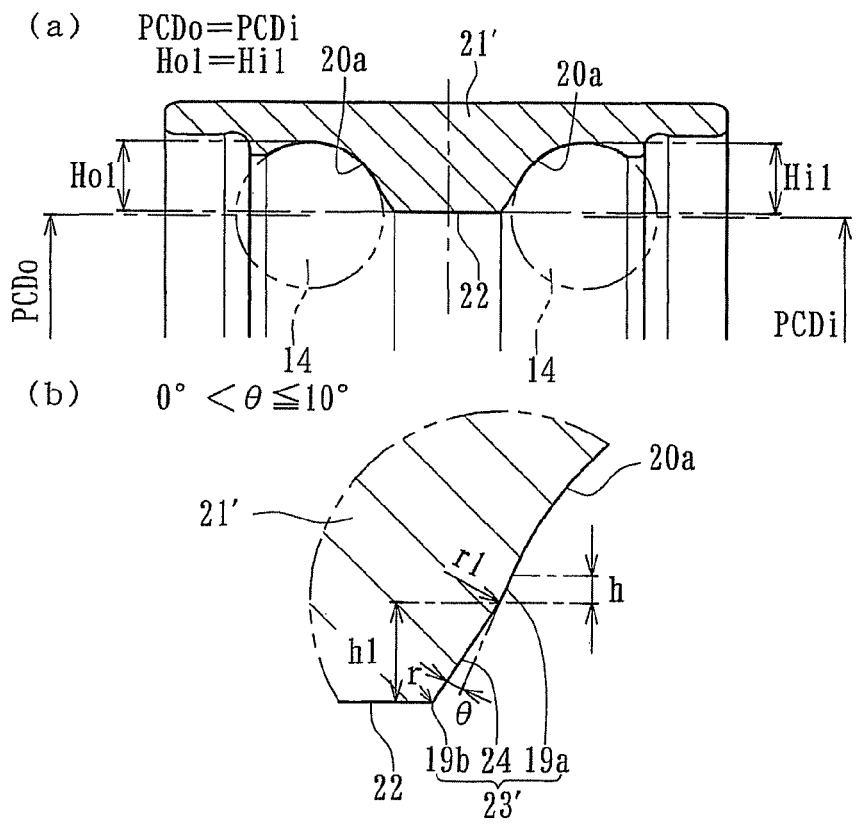

[Fig 7]
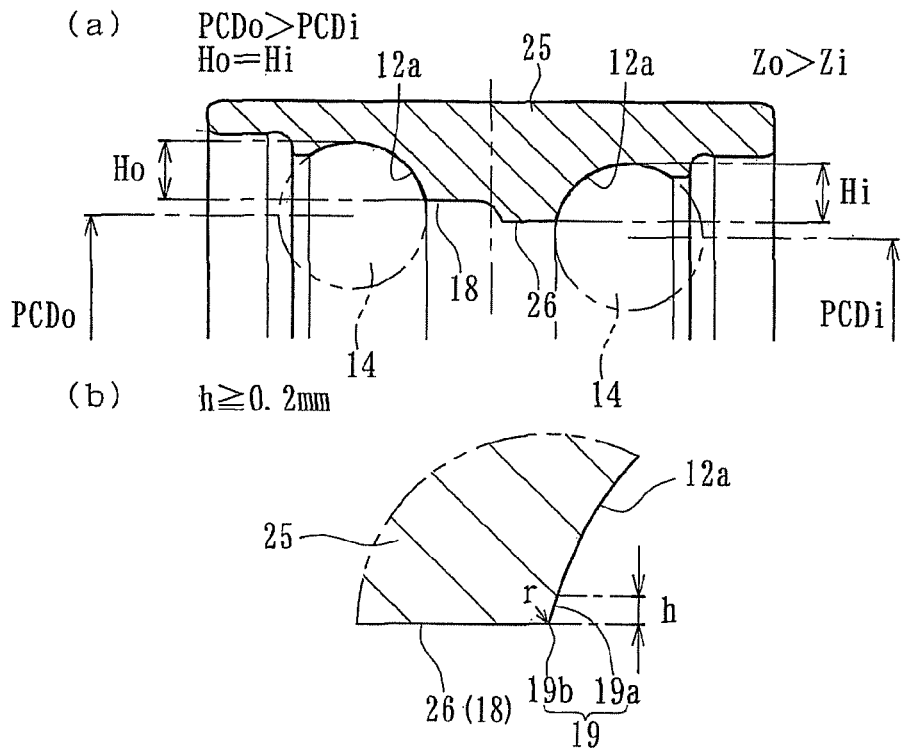
[Fig 8]
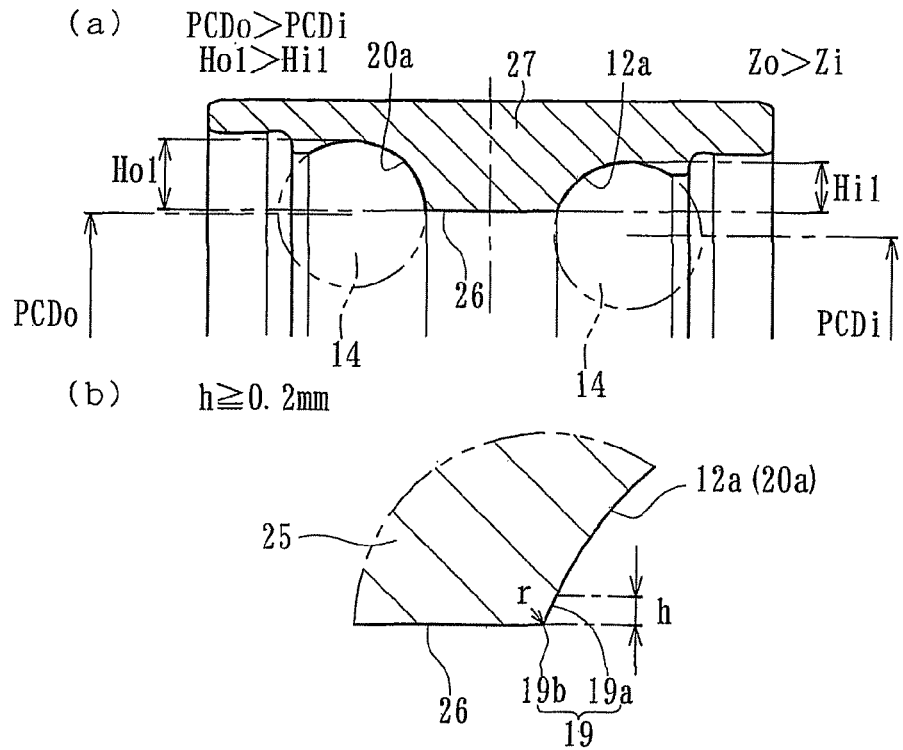

[Fig 9]
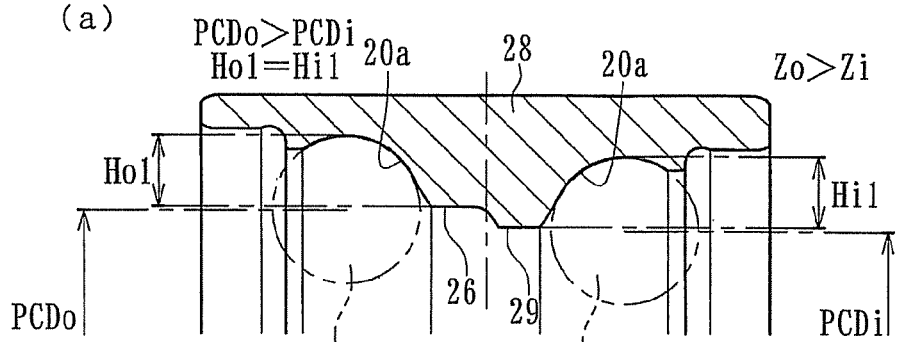
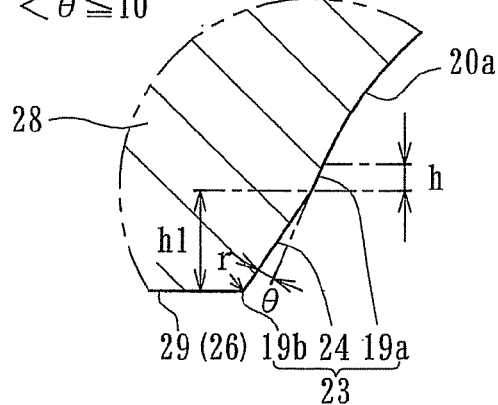
[Fig 10]
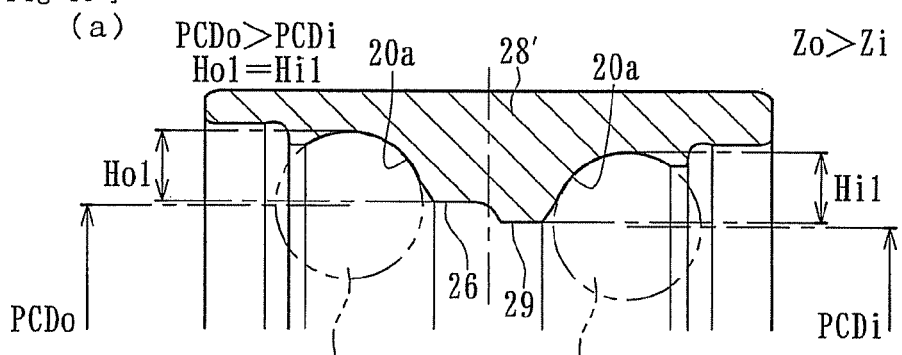
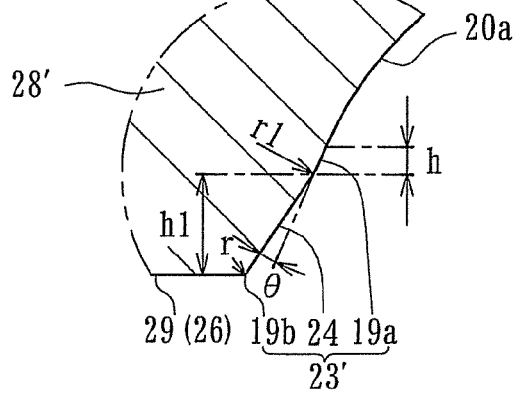

[Fig 11]
PRIOR ART
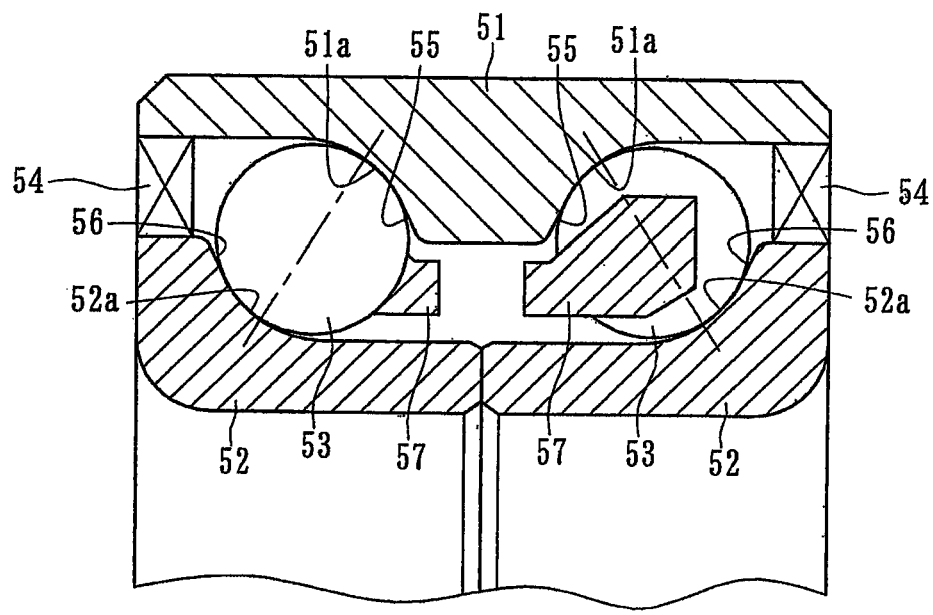
[Fig 12]
PRIOR ART
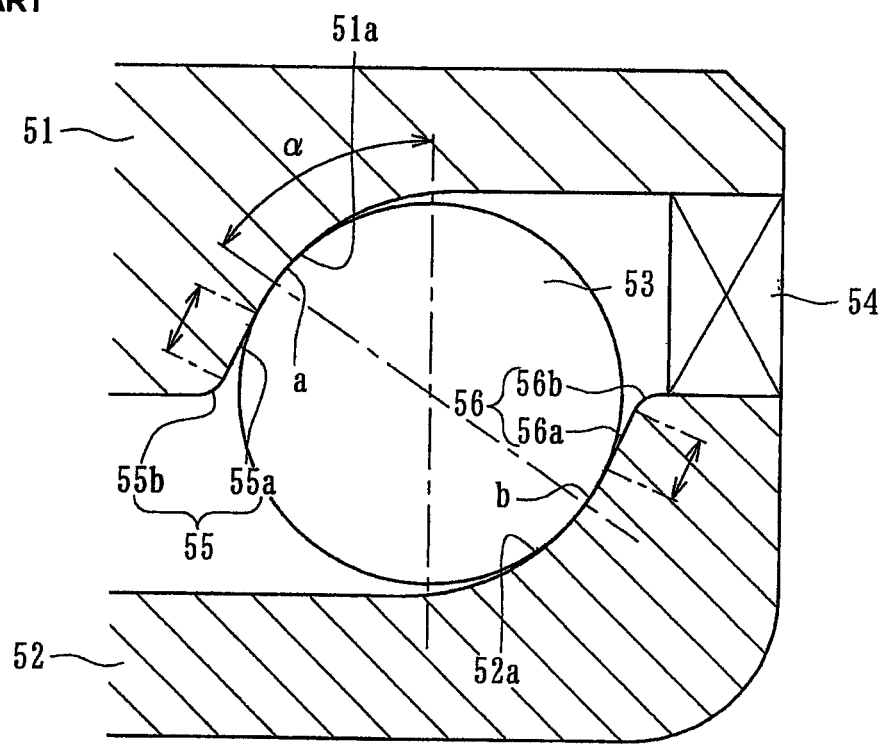

WHEEL BEARING APPARATUS

CROSS-REFERENCE TO RELATED APPLICATIONS

This application is a continuation of International Application No. PCT/JP2011/061557, filed May 19, 2011, which claims priority to Japanese Application No. 2010-115965, filed May 20, 2010. The disclosures of the above applications are incorporating herein by reference.

FIELD

The present disclosure relates to a wheel bearing apparatus that rotatably supports a wheel of a vehicle, such as an automobile, and, more particularly, to a wheel bearing apparatus that prevents shoulder overriding of the contact ellipse of the ball, generation of edge loads, and thus improves the noise level and life of the wheel bearing.

BACKGROUND

Wheel bearing apparatus exist for driving wheels and driven wheels to support a wheel of a vehicle that rotatably supports a wheel hub that mounts a wheel via a rolling bearing. For structural reasons, the inner ring rotation type is used for driving wheels and both the inner ring rotation type and the outer ring rotation type are used for driven wheels. Double row angular contact ball bearings, with low rotational torque characteristics, are popularly adopted in the wheel bearing apparatus. These bearings have a desirable bearing rigidity, exhibit high durability against misalignment and improve fuel consumption. In the double row angular contact ball bearing, a plurality of balls is interposed between a secured ring and a rotational ring. The rings contact the balls by applying a predetermined contact angle to the balls.

The wheel bearing apparatuses are broadly classified into the first, second, third and fourth generation type. In the first generation type, a wheel bearing includes a double row angular contact ball bearing fit between a knuckle, forming part of a suspension apparatus, and a wheel hub. The second generation type has a body mounting flange or a wheel mounting flange directly formed on the outer circumference of an outer member (outer ring). The third generation type has one inner raceway surface directly formed on the outer circumference of a wheel hub. The fourth generation type has the inner raceway surface directly formed on the outer circumferences, respectively, of the wheel hub and the outer joint member of the constant velocity universal joint.

In recent years, there have been strong desires to improve "NVH" i.e. "Noise", "Vibration" and "Harshness" to say nothing of improving the durability and reducing the manufacturing cost. As shown in FIG. 11, a prior art wheel bearing 50 used in the wheel bearing apparatus is formed by a double row angular contact ball bearing. It includes an outer member 51 formed on its inner circumference with a double row outer raceway surface 51a with a circular arc cross-section. A pair of inner rings 52, 52 each includes an inner raceway surface 52a on its outer circumference. The inner raceway surfaces 52a have a circular arc cross-section and they oppose the double row outer raceway surfaces 51a. Double row balls 53 are contained between the outer and inner raceway surfaces, via a cage 57. The bearing portion of each row has a contact angle α. A seal 54 is mounted in annular openings formed between the outer member 51 and the inner ring 52 to prevent leakage of lubricating grease sealed within the bearing and the entry of rain water or dust into the bearing from the outside.

As shown in FIG. 12, the higher shoulder edges 55, 56, in cross-section, of the outer and inner raceway surfaces 51a, 52a, are formed with auxiliary raceway surfaces 55a, 56a smoothly continuous, respectively, to curves "a", "b" of the circular arc cross-section. Each of the auxiliary raceway surfaces 55a, 56a has a cross-section formed by a curve or straight line having a curvature smaller than that of the curves "a", "b". Chamfered portions 55b, 56b each have a circular arc cross-section and are continuous with the auxiliary raceway surfaces 55a, 56a.

In such a wheel bearing apparatus, with the auxiliary raceway surfaces 55a, 56a, when a large load amount is loaded on the bearing and the contact angle α increases, the contact ellipse of ball 53 is "pushed out" from each raceway surface 51a, 52a to the auxiliary raceway surfaces 55a, 56a. However, since the auxiliary raceway surfaces 55a, 56a are smoothly continuous with the curves "a", "b", forming the cross-section of the raceway surfaces 51a, 52a, and have straight cross-sections, the generation of the edge load (excessive stress) will be prevented. However, the contact ellipse is pushed out to the auxiliary raceway surfaces 55a, 56a.

In addition, each of the auxiliary raceway surfaces 55a, 56a has a straight cross-section. Thus, it is possible to set the inclination of the auxiliary raceway surfaces 55a, 56a larger as compared with an inclination formed by an extension of the circular arc curves "a", "b" of the raceway surfaces 51a, 52a. Also, the inner diameter of the outer member 51 is set to be small or the outer diameter of the inner ring 52 is set to be large. Accordingly, a condition where the auxiliary raceway surfaces 55a, 56a have to be ground using a side surface of a grinding wheel can be avoided. Thus, grinding time can be reduced.

In addition, the raceway surfaces 51a, 52a have, respectively, the chamfered surfaces 55b, 56b with circular arc cross-section, continuous to edges of the auxiliary raceway surfaces 55a, 56a. Thus, the edge load of the contact ellipse can be further reduced (see Japanese Laid-open Patent Publication No. 2007-85555).

In this kind of wheel bearing apparatus, the contact ellipse of the ball 53 overrides the shoulder portion of the raceway surface if an excessive load is input onto the wheel bearing from a wheel. Thus, indentations are generated on the shoulder and cause abnormal noise when a vehicle climbs a curb. In order to solve the indentation problem caused in the shoulder of the raceway surface, it is necessary to increase the shoulder height of the raceway surface. However, an increase in the shoulder height causes problems like an increase in the weight of wheel bearing, reduction of its workability and finally an increase in manufacturing costs. On the other hand, sufficient sealability will not be assured due to a reduction of the cross-section height of the seal 54 and an increase in height of the shoulder of the inner ring 52, if it is increased. In the present specification, the term "shoulder overriding" means a phenomenon where the contact ellipse formed in a contact portion between the ball 53 and the outer raceway surface 51a is pushed out from the corner between the inner diameter of the outer member 51 and the outer raceway surface 51a. This generates the edge load when a large moment load is applied to the wheel bearing.

SUMMARY

It is an object of the present disclosure to provide a wheel bearing apparatus that prevents the generation of edge load of the contact ellipse of the ball and improves the noise level and life of the wheel bearing.

To achieve the object of the present disclosure, a wheel bearing apparatus includes an outer member, an inner member and double row ball rollers. The outer member inner circumference includes double row outer raceway surfaces, each having a circular arc. The inner member outer circumference includes double row inner raceway surfaces, each having a circular arc, and arranged opposite to the double row outer raceway surfaces. The double row of ball rollers are rollably contained between both raceway surfaces, via cages. A corner of a shoulder portion of the outer member includes a relief surface formed of a straight line that is a tangent line of the outer raceway surfaces. A chamfered portion, round in a circular arc, has a predetermined radius of curvature. The corner is formed simultaneously by a formed grinding wheel forming the double row outer raceway surfaces. The corner is formed smoothly continuous from each of outer raceway surfaces. A length in the radial direction of the relief surface is set to be greater than or equal to 0.2 mm.

As described above, in the wheel bearing apparatus with double row angular contact ball bearing used in the first through the fourth generation structures, the corner of the shoulder portion of the outer member is designed as the relief surface and the chamfered portion. The relief surface is formed from the straight line that is the tangent line of the outer raceway surfaces. The chamfered portion is round in the circular arc and has a predetermined radius of curvature. The corner is formed simultaneously by the formed grinding wheel forming the double row outer raceway surfaces. The corner is formed smoothly continuous from each of outer raceway surfaces. The length in the radial direction of the relief surface is set to be greater than or equal to 0.2 mm. This prevents the shoulder overriding of the contact ellipse of the ball and effectively prevents the generation of the edge load. Further, it is possible to improve the noise levels and life of the wheel bearing. Accordingly, the resistance against the generation of indentations on the corner increases. Thus, the occurrence of abnormal noise due to the shoulder overriding of the contact ellipse of the ball and the occurrence of the indentation in the shoulder portion may be prevented.

The shoulder height, with respect to the ball diameter of the double row of the ball rows, is set in a range of 0.35 to 0.50 mm. This improves the resistance against the generation of indentation and reliably prevents the shoulder overriding.

The shoulder height of the outer raceway surface in a side, where large moment load is applied, is set larger than the shoulder height of the other outer raceway surface in the double row outer raceway surfaces. This improves the resistance against the generation of indentation, prevents the shoulder overriding of the contact ellipse of the ball and prevents the generation of the edge load. This occurs even though a large moment load is applied to the ball row. Further, it is possible to improve the noise level and life of the wheel bearing.

A shoulder height $Ho1$ of the outer raceway surface of the outer-side, in the double row outer raceway surfaces, with respect to the ball diameter $do$ of the ball row is set in a range of $Ho1/do=0.40$ to $0.50$. A shoulder height $Hi1$ of the outer raceway surface of the inner-side with respect to the ball diameter $di$ of the ball row is set in a range of $Hi1/di=0.35$ to $0.45$. This improves the resistance against the generation of indentation, prevents the shoulder overriding of the contact ellipse of the ball compared to the ball row of the inner-side and prevents the generation of the edge load. This occurs even though a large moment load is applied to the ball row of the outer-side. Further, it is possible to improve the noise level and life of the wheel bearing.

A pitch circle diameter of the ball row of the outer-side in the double row of the ball rows is set larger than a pitch circle diameter of the ball row of the inner-side. The number of balls of the ball row of the outer-side is set greater than the number of balls of the inner-side. This further increases the basic load rating of the ball row of the outer-side than that of the ball row of the inner-side. Thus, this improves the resistance against the generation of indentation, prevents the shoulder overriding of the contact ellipse of the ball and prevents the generation of the edge load. This occurs even though a large moment load is applied to the ball row of the outer-side. Further, it is possible to improve the noise level and life of the wheel bearing.

A second relief surface is formed on a turning surface. The second relief surface extends in a straight line shape with a predetermined inclined angle from the relief surface. This enables suppression of the indentation depth of the corner. Also, it prevents the occurrence of the abnormal sound due to the shoulder overriding of the contact ellipse of the ball. Further, it prevents the occurrence of the indentation in the shoulder portion.

The inclined angle of the second relief surface, with respect to the relief surface, is set lower than or equal to 10°. This suppresses the indentation depth of the corner.

The relief surface and the second relief surface are connected by a circular arc surface with a predetermined radius of curvature. This further suppresses the indentation depth of the corner, prevents the occurrence of abnormal sound due to the shoulder overriding of the contact ellipse of the ball and prevents the occurrence of the indentation in the shoulder portion.

A surface roughness of the circular arc surface is restricted to lower than or equal to 3.2 Ra. This suppresses the occurrence of scratching on the ball even though the ball contacts the corner during assembly. Also, it prevents the occurrence of abnormal sound due to scratching on the ball.

A surface roughness of the second relief surface is restricted to lower than or equal to 3.2 Ra. This suppresses the occurrence of scratching on the ball even though the ball contacts the corner during assembly. Also, it prevents the occurrence of abnormal sound due to scratching on the ball.

The wheel bearing apparatus of the present disclosure includes an outer member, inner member and double row balls. The outer member inner circumference is integrally formed with double row outer raceway surfaces, each having a circular arc. The inner member outer circumference includes double row inner raceway surfaces. Each inner raceway surface has a circular arc and is adapted to be arranged opposite to the double row outer raceway surfaces. The double row of the ball rows are rollably contained between both raceway surfaces, via cages. A corner of a shoulder portion of the outer member is configured as a relief surface. The relieve surface is formed of a straight line that is a tangent line of the outer raceway surfaces. A chamfered portion is round in a circular arc with a predetermined radius of curvature. The corner is formed simultaneously by a formed grinding wheel forming the double row outer raceway surfaces. A corner is formed smoothly continuous from each of outer raceway surfaces. A length in the radial direction of the relief surface is set to be greater than or equal to 0.2 mm. This prevents the shoulder overriding of the contact ellipse of the ball and effectively prevents the generation of the edge load. Further, it is possible to improve the noise level and life of the wheel bearing. Accordingly, the resistance against the generation of indentation of the corner increases. Thus, the occurrence of abnormal noise due to the shoulder overriding of the contact ellipse of the ball and the occurrence of the indentation in the shoulder portion may prevented.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal sectional view of an embodiment of a wheel bearing apparatus;

FIG. 2 is a longitudinal sectional view of the wheel bearing of FIG. 1;

FIG. 3(a) is a longitudinal sectional view of an outer member of FIG. 2;

FIG. 3(b) is an enlarged sectional view of a main portion of FIG. 3(a);

FIG. 4(a) is a longitudinal sectional view of a modification of the outer member of FIG. 2;

FIG. 4(b) is an enlarged sectional view of a main portion of FIG. 4(a);

FIG. 5(a) is a longitudinal sectional view of another modification of the outer member of FIG. 2;

FIG. 5(b) is an enlarged sectional view of a main portion of FIG. 5(a);

FIG. 6(a) is a longitudinal sectional view of another modification of the outer member of FIG. 2;

FIG. 6(b) is an enlarged sectional view of a main portion of FIG. 6(a);

FIG. 7(a) is a longitudinal sectional view of another modification of the outer member of FIG. 2;

FIG. 7(b) is an enlarged sectional view of a main portion of FIG. 7(a);

FIG. 8(a) is a longitudinal sectional view of another modification of the outer member of FIG. 2;

FIG. 8(b) is an enlarged sectional view of a main portion of FIG. 8(a);

FIG. 9(a) is a longitudinal sectional view of another modification of the outer member of FIG. 2;

FIG. 9(b) is an enlarged sectional view of a main portion of FIG. 9(a);

FIG. 10(a) is a longitudinal sectional view of another modification of the outer member of FIG. 2;

FIG. 10(b) is an enlarged sectional view of a main portion of FIG. 10(a);

FIG. 11 is a longitudinal sectional view of a related art wheel bearing; and

FIG. 12 is an enlarged sectional view of a main portion of FIG. 11.

DETAILED DESCRIPTION

A wheel bearing apparatus includes an outer member, inner member and double row balls. The outer member inner circumference is integrally formed with double row outer raceway surfaces, each having a circular arc. The inner member includes a pair of inner rings. Each ring outer circumference includes an inner raceway surface. Each inner raceway surface has a circular arc and is adapted to be arranged opposite to the double row outer raceway surfaces. The double row of the ball rows are rollably contained between both raceway surfaces, via cages. The shoulder height of the outer member, with respect to the ball diameter of the double row of the ball rows, is set in a range of 0.35 to 0.50. A corner of a shoulder portion is configured as a relief surface. The relief surface is a straight line that is a tangent line of the outer raceway surfaces. A chamfered portion is round in a circular arc with a predetermined radius of curvature. The corner is formed simultaneously by a formed grinding wheel forming the double row outer raceway surfaces. The corner is formed smoothly continuous from each of the outer raceway surfaces. A length in the radial direction of the relief surface is set to be greater than or equal to 0.2 mm.

Embodiments of the present disclosure will be hereinafter described with reference to the drawings.

FIG. 1 is a longitudinal sectional view showing an embodiment of a wheel bearing apparatus. FIG. 2 is a longitudinal sectional view showing the wheel bearing of FIG. 1. FIG. 3(a) is a longitudinal sectional view showing an outer member of FIG. 2. FIG. 3(b) is an enlarged view showing a main portion of FIG. 3(a). FIG. 4(a) is a longitudinal sectional view showing a modification of the outer member of FIG. 2. FIG. 4(b) is an enlarged view showing a main portion of FIG. 4(a). FIGS. 5(a) to 10(a) are longitudinal sectional views showing other modifications of the outer member of FIG. 2. FIGS. 5(b) to 10(b) are enlarged views showing main portions of FIGS. 5(a) to 10(a), respectively. In addition, in the description below, an outer side of the wheel bearing apparatus, when it is mounted on a vehicle, is referred to as the "outer-side" (the left side in FIG. 1). The center is referred to as the "inner-side" (the right side in FIG. 1).

The illustrated wheel bearing apparatus is a so-called first generation type used for a driving wheel. It includes a wheel hub 1 and a wheel bearing 3 press fit onto the wheel hub 1. The wheel bearing 3 rotatably supports the wheel hub 1 with respect to a knuckle 2. The wheel hub 1 has a wheel mounting flange 4 to mount a wheel W at its outer-side end. The wheel hub outer circumference is defined by a cylindrical portion 5 that extends in an axial direction from the wheel mounting flange 4. In the wheel mounting flange 4, hub bolts 4a fasten the wheel W and a brake rotor B. The hub bolts 4 are implanted equidistantly in the circumferential direction. In addition, serrations (or splines) 6, for transmitting torque, are formed in the inner circumference of the wheel hub 1. The wheel bearing 3 is press fit onto the outer circumferential surface of the cylindrical portion 5.

The wheel hub 1 is made of medium/high carbon steel including carbon of 0.40 to 0.80 % by weight such as S53C. It is hardened by high frequency induction hardening so that a region from an inner-side base of the wheel mounting flange 4 to the cylindrical portion 5 has a surface hardness in a range of 50 to 64 HRC. Accordingly, this makes it possible to apply a sufficient mechanical strength against a rotary bending load applied to the wheel mounting flange 4. This improves the anti-fretting property of the cylindrical portion 5 that is the fitting portion of the wheel bearing 3, and improves the durability of the wheel hub 1.

The wheel bearing 3 is fixed in a state where the wheel bearing 3 is clamped between the wheel hub 1 and a shoulder portion 9 of an outer joint member 8 of a constant velocity universal joint 7. A stem portion 10 extends from the shoulder portion 9. The stem portion 10 is integrally formed with the outer joint member 8 in the axial direction.

The outer circumference of the stem portion 10 has a male thread 10b and serrations (or splines) 10a that engage the serrations 6 of the wheel hub 1. Thus, torque from an engine is transmitted to the wheel hub 1 via a drive shaft (not shown), the constant velocity universal joint 7 and the serrations 10a of the stem portion 10. Further, a fixing nut 11 is fastened to the male thread 10b of the stem portion 10. Tightening of the nut applies a predetermined fastening torque which, in turn, applies a desired bearing preload onto the wheel bearing 3.

As shown in enlarged view of FIG. 2, the wheel bearing 3 includes an outer member (an outer ring) 12, a pair of inner rings 13, 13 inserted into the outer member 12, and double row balls 14, 14 contained between the outer member 12 and the inner rings 13. The wheel bearing is a back surface combination-type double row angular contact ball bearing. It is set in a state where end surfaces in the front side of the pair of inner rings 13, 13 abut one another.

The outer member 12 is made of high carbon-chromium bearing steel such as SUJ2. The double row outer raceway surfaces 12a, 12a are integrally formed in the inner circumference. The inner rings 13 are made from high carbon-chromium bearing steel such as SUJ2. The inner raceway surfaces 13a are formed to face the double row outer raceway surfaces 12a, 12a. Thus, the double row balls 14, 14, made of the high carbon-chromium bearing steel such as SUJ2, are received between the raceway surfaces 12a, 13a, respectively. The balls 14, 14 are rollably held by cages 15, 15. In addition, seals 16, 17 are provided on the end portions of the wheel bearings 3. The seals 16, 17 prevent leakage of lubrication grease enclosed in the bearing, and entry of rain water, dust or the like from the outside into the bearing.

In this embodiment, a pitch circle diameter PCDo of the outer-side ball 14 row and a pitch circle diameter PCDi of the inner-side ball 14 row are set to be the same diameter (PCDo=PCDi). A ball diameter do of the outer-side ball 14 row and a ball diameter di of the inner-side ball 14 row are set to be the same diameter (do=di). The number of balls Zo of the outer-side ball 14 row and the number of balls Zi of the inner-side ball 14 row are set to be the same (Zo=Zi).

Here, as shown in FIG. 3(a), heights Ho, Hi of the shoulders of the double row outer raceway surfaces 12a, 12a of the outer member 12 are set to be the same. In addition, the heights Ho, Hi of the shoulders, with respect to the ball diameters do, di of the ball 14 row, are set in a range of Ho/do=Hi/di=0.35 to 0.50 mm. Thus, as shown in FIG. 3(b), a corner 19 of the shoulder portion 18 is configured as a relief surface 19a and a chamfered portion 19b. The relief surface 19a is formed on the straight line which is a tangent line of the outer raceway surface 12a, having a circular arc in cross-section. The chamfered portion 19b is round with a circular arc having a radius of curvature r of R 0.15 to 2.0. Thus, the corner 19 is formed simultaneously by a formed grinding wheel forming the double row outer raceway surfaces 12a, 12a. The corner 19 is formed smoothly continuous by each of the outer raceway surfaces 12a, 12a. For example, "relief surface" can be obtained by measuring the cross-section shape and calculating a turning point of R and non-R. Here, a region of non-R is from a turning point referred to as "the relief surface". Thus, a length in the radial direction of "the relief surface" is h and the radius of the outer race surface is R.

Usually, the grinding process of the double row outer raceway surfaces 12a, 12a is configured such that a grinding wheel is arranged in the inner diameter side of the double row outer raceway surfaces 12a, 12a. The process is performed while transporting the grinding wheel to the outside in the radial direction. When the shoulder height of the outer member 12 is high, the corner 19 of the shoulder portion 18 is processed with the side surface of the grinding wheel. Since a pressing force in the cutting direction is not enough, the process time is long. However, in the embodiment, since the corner 19 of the shoulder portion 18 is configured as the relief surface 19a and the chamfered portion 19b, enough pressing force is obtained. Thus, the process time becomes short. A preferred process efficiency can be maintained even though the shoulder height is set to be high. The applicant of the present disclosure produced samples specified in Table 1 below and an indentation resistance test of the corner of the shoulder portion is carried out.

TABLE 1

| | 1.4 G equivalent moment load | | |
|---|---|---|---|
| Specification | Length of radius of relief surface (height in radial direction) | Height of groove (H/D) | Depth of indentation of shoulder portion |
| Related art (R = 0.5) | aiming 0.2 mm | 0.38 | 0.8 to 1.8 μm |
| Relief surface of grinding | aiming 0.2 mm aiming 0.7 mm | 0.38 0.42 | 1.0 to 1.6 μm 0 |

As is clear from the result of the indentation resistance test, when the relief surface 19a is formed on a straight line which is the tangent line of the outer raceway surface 12a, having a circular arc in cross-section, and the length h in its radial direction is greater than or equal to 0.2 mm, the resistance against the generation of indentation (difficulty of occurrence of the indentation) of the corner increases. Thus, riding of a contact ellipse of the ball 14 over the shoulder portion and the occurrence of abnormal noise due to the indentation in the shoulder portion 18 can be prevented. Accordingly, the process efficiency can also be maintained.

A modification of the outer member is shown in FIG. 4. As shown in FIG. 4(a), in the outer member 20, the pitch circle diameter PCDo of the outer-side ball 14 row and the pitch circle diameter PCDi of the inner-side ball 14 row are set to be the same diameter (PCDo=PCDi). The ball diameter do of the outer-side ball 14 row and the ball diameter di of the inner-side ball 14 row are set to be the same diameter (do=di). The number of balls Zo of the outer-side ball 14 row and the number of balls Zi of the inner-side ball 14 row are set to be the same (Zo=Zi).

In addition, the heights Ho1, Hi1 of the shoulders of the double row outer raceway surfaces 20a, 12a are set to be different from each other. In other words, the shoulder height Ho1 of the outer raceway surface 20a of the outer-side, with respect to the ball diameter do of the ball 14 row, is set in a range of Ho1/do=0.40 to 0.50. The shoulder height Hi1 of the outer raceway surface 12a of the inner-side, with respect to the ball diameter di of the ball 14 row, is set in a range of Hi1/di=0.35 to 0.45 (Ho1≥Hi1).

Thus, as shown in FIG. 4(b), the corner 19 of both shoulder portions 18 includes the relief surface 19a and the chamfered portion 19b. The relief surface 19a is formed from the straight line which is the tangent line of the outer raceway surfaces 20a, 12a, having a circular arc in cross-section. The chamfered portion 19b is rounded into a curve with a radius of curvature r of R 0.15 to 2.0. Thus, the corner 19 is formed simultaneously by a formed grinding wheel forming the double row outer raceway surfaces 20a, 12a. The corner 19 is formed smoothly continuous from each of the outer raceway surfaces 20a, 12a.

Accordingly, basic load ratings of the outer-side ball 14 row and the inner-side ball 14 row are the same as each other. The resistance against the generation of indentation is improved and the shoulder riding of the contact ellipse of the ball 14 is prevented. Thus, the occurrence of the edge load is prevented compared to the inner side ball 14 row. Also, the noise level and the life are improved. This all occurs even though a large moment load is applied to the outer-side ball 14 row.

Another modification of the outer member is shown in FIG. 5. As shown in FIG. 5(a), the outer member 21, has the pitch circle diameter PCDo of the outer-side ball 14 row and the pitch circle diameter PCDi of the inner-side ball 14 row set to be the same diameter (PCDo=PCDi). The ball diameter do of the outer-side ball 14 row and the ball diameter di of the inner-side ball 14 row are set to be the same diameter (do=di). The number of balls Zo of the outer-side ball 14 row and the number of balls Zi of the inner-side ball 14 row are set to be the same (Zo=Zi).

In addition, the heights Ho1, Hi1 of the shoulders of the double row outer raceway surfaces 20a, 20a are set to be the same as each other. Thus, the heights Ho1, Hi1 of the shoulders, with respect to the ball diameter do of the ball 14 row, are set to be in a range of Ho1/do=Hi1/di=0.40 to 0.50.

Thus, as shown in FIG. 5(b), the corner 23 of both shoulder portions 22 is configured with the relief surface 19a, a second relief surface 24 and the chamfered portion 19b. The relief surface 19a is formed from the straight line which is the tangent line of the outer raceway surfaces 20a, 20a, having the circular arc in cross-section. The second relief surface 24 is a straight line shape extending from the relief surface 19a. The second relief surface 24 has an inclined angle θ and is formed with a turning surface. The relief surface 19a is formed simultaneously by the formed grinding wheel forming the double row outer raceway surfaces 20a, 20a. The relief surface 19a is formed smoothly continuous from each of the outer raceway surfaces 20a, 20a. Here, it is desirable that the surface roughness of the second relief surface 24 be restricted to lower than or equal to 3.2 Ra. Ra is one parameter of roughness shape in JIS (JIS B0601-1994) and is an average value of an absolute value deviation from an average line as an arithmetic average roughness. Accordingly, even though the ball 14 contacts the corner 23 during assembly, occurrence of scratching on the ball 14 can be suppressed. Also, the occurrence of abnormal sound due to scratching on the ball can be prevented.

In addition, the inclined angle θ of the second relief surface 24 with respect to the relief surface 19a is set to be lower than or equal to 10°. Further, the length h in the radial direction of the relief surface 19a is set to be greater than or equal to 0.2 mm. The length h1 in the radial direction of the second relief surface 24 is set to be in a range of 0.2 to 0.7 mm. Accordingly, the depth of the indentation of the corner 23 can be suppressed. The occurrence of abnormal sound because the contact ellipse of the ball 14 rides the shoulder and the indentation occurs in the shoulder portion 22, can be prevented. Also, the resistance against the generation of indentation and the balance of the weight can be preferably set.

Another modification of the outer member is shown in FIG. 6. The outer member 21' has a different configuration from the outer member 21 and from the corner of the shoulder of FIG. 4. In other words, the heights Ho1, Hi1 of shoulders of the double row outer raceway surfaces 20a, 20a are set to be the same as each other. Thus, the heights Ho1, Hi1 of the shoulders with respect to the ball diameter do of the ball 14 row are set to be in a range of Ho1/do=Hi1/di=0.40 to 0.50.

As shown in FIG. 6(b), a corner 23' of both shoulder portions 22 includes the relief surface 19a, the second relief surface 24 and the chamfered portion 19b. The relief surface 19a and the second relief surface 24 can be connected with a circular arc surface with a predetermined radius of curvature r1. Accordingly, the depth of the indentation of the corner 23' can be suppressed. Also, the occurrence of abnormal sound because the contact ellipse of the ball 14 rides the shoulder portion and the indentation occurs in the shoulder portion 22, can be prevented.

Another modification of the outer member is shown in FIG. 7. As shown in FIG. 7(a), the outer member 25 has the pitch circle diameter PCDo of the outer-side ball 14 row set larger than the pitch circle diameter PCDi of the inner-side ball 14 row (PCDo>PCDi). The ball diameter do of the outer-side ball 14 row and the ball diameter di of the inner-side ball 14 row are set to be the same as each other (do=di). The number of balls Zo of the outer-side ball 14 row is set greater than the number of balls Zi of the inner-side ball 14 row (Zo>Zi).

In addition, the heights Ho, Hi of the shoulders of the double row outer raceway surfaces 12a, 12a are set to be the same as each other. In other words, the shoulder height Ho1 of the outer raceway surface 20a of the outer-side, with respect to the ball diameter do of the ball 14 row, is set in a range of Ho/do=Hi/di=0.35 to 0.50.

As shown in FIG. 7(b), the corner 19 of the shoulder portions 18, 26 include the relief surface 19a and the chamfered portion 19b. The relief surface 19a is formed from the straight line that is the tangent line of the outer raceway surfaces 12a, 12a, having the circular arc in cross-section. The chamfered portion 19b is round in the circular arc with a radius of curvature r of R0.15 to 2.0. Thus, the corner 19 is formed simultaneously by the formed grinding wheel forming the double row outer raceway surfaces 12a, 12a. The corner 19 is formed smoothly continuous from each of the outer raceway surfaces 12a, 12a.

Accordingly, the basic load ratings of the outer-side ball 14 row and the inner-side ball 14 row increase. The resistance against the generation of indentation is improved. The shoulder riding of the contact ellipse of the ball 14 is prevented. The occurrence of the edge load is prevented. Also, the noise level and the life are improved. This occurs even though a large moment load is applied to the outer-side ball 14 row.

Another modification of the outer member is shown in FIG. 8. As shown in FIG. 8(a), the outer member 27 has the pitch circle diameter PCDo of the outer-side ball 14 row set larger than the pitch circle diameter PCDi of the inner-side ball 14 row (PCDo>PCDi). The ball diameter do of the outer-side ball 14 row and the ball diameter di of the inner-side ball 14 row are set to be the same as each other (do=di). The number of balls Zo of the outer-side ball 14 row is set greater than the number of balls Zi of the inner-side ball 14 row (Zo>Zi).

In addition, the heights Ho1, Hi1 of the shoulders of the double row outer raceway surfaces 20a, 12a are set different from each other. In other words, the shoulder height Ho1 of the outer raceway surface 20a of the outer-side with respect to the ball diameter do of the ball 14 row is set in a range of Ho1/do=0.40 to 0.50. The shoulder height Hi1 of the outer raceway surface 12a of the inner-side with respect to the ball diameter di of the ball 4 row is set in a range of Hi1/di=0.35 to 0.45 (Ho1≥Hi1).

As shown in FIG. 8(b), the corner 19 of the shoulder portion 26 includes the relief surface 19a and the chamfered portion 19b. The relief surface 19a is formed from the straight line that is the tangent line of the outer raceway surfaces 12a, 12a, having the circular arc in cross-section. The chamfered portion 19b is rounded into the circular arc with the radius of curvature r of R 0.15 to 2.0. Thus, the corner 19 is formed simultaneously by the formed grinding wheel forming the double row outer raceway surfaces 20a, 12a. The corner 19 is formed smoothly continuous from each of the outer raceway surfaces 20a, 12a.

Accordingly, the basic load ratings of the outer-side ball 14 row and the inner-side ball 14 row increase. The resistance against the generation of indentation is improved. The shoulder riding of the contact ellipse of the ball 14 is prevented compared to the inner-side ball 14 row. The occurrence of the edge load is prevented. Also, the noise level and the life are improved. This all occurs even though a large moment load is applied to the outer-side ball 14 row.

Another modification of the outer member is shown in FIG. 9. As shown in FIG. 9(a), the outer member 28 has the pitch circle diameter PCDo of the outer-side ball 14 row set larger than the pitch circle diameter PCDi of the inner-side ball 14 row (PCDo>PCDO. The ball diameter do of the outer-side ball 14 row and the ball diameter di of the inner-side ball 14 row are set to be the same (do=di) as each other. The number of balls Zo of the outer-side ball 14 row is set greater than the number of balls Zi of the inner-side ball 14 row (Zo>Zi).

In addition, the heights Ho, Hi of the shoulders, of the double row outer raceway surfaces 20a, 20a are set to be the same as each other. In other words, the heights Ho1, Hi1 of the shoulders of the double row outer raceway surfaces 20a, 20a of the outside with respect to the ball diameters do, di of the ball 14 row are set in a range of Ho1/do=Hi1/di=0.35 to 0.50.

As shown in FIG. 9(b), the corner 23 of the shoulder portions 26, 29 include the relief surface 19a, a second chamfered portion 24 and the chamfered portion 19b. The relief surface 19a is formed from the straight line that is the tangent line of the outer raceway surfaces 20a, 20a, having the circular arc in cross-section. The second chamfered portion 24 is formed from the straight line shape extending from the relief surface 19a with the inclined angle θ and is formed with the turning surface. The relief surface 19a is formed simultaneously by the formed grinding wheel forming the double row outer raceway surfaces 20a, 20a. The relief surface 19a is formed smoothly continuous from each of the outer raceway surfaces 20a, 20a.

In addition, the inclined angle θ of the second relief surface 24 with respect to the relief surface 19a is set lower than or equal to 10°. Further, the length h in the radial direction of the relief surface 19a is set greater than or equal to 0.2 mm. The length h1 in the radial direction of the second relief surface 24 is set in a range of 0.2 to 0.7 mm. Accordingly, the depth of the indentation of the corner 23 can be suppressed. Occurrence of abnormal sound, because the contact ellipse of the ball 14 rides the shoulder and the indentation occurs in the shoulder portions 26, 29, can be prevented. The resistance against the generation of indentation and the balance of the weight can be preferably set.

Accordingly, the basic load ratings of the outer-side ball 14 row and the inner-side ball 14 row increase. The resistance against the generation of indentation is improved. The shoulder riding of the contact ellipse of the ball 14 is prevented. The occurrence of the edge load is prevented. The noise level and the life are improved. This occurs even though a large moment load is applied to the outer-side ball 14 row.

Another modification of the outer member is shown in FIG. 10. The outer member 28' is different in the configuration of the outer member 28 and the corner of the shoulder portion of FIG. 9. In other words, the heights Ho1, Hi1 of the shoulders of the double row outer raceway surfaces 20a, 20a are set the same as each other. Thus, the heights Ho1, Hi1 of the shoulders with respect to the ball diameter do of the ball 14 row are set in a range of Ho1/do=Hi1/di=0.40 to 0.50.

As shown in FIG. 10(b), a corner 23' of both shoulder portions 26, 29 includes the relief surface 19a, the second relief surface 24 and the chamfered portion 19b. The relief surface 19a and the second relief surface 24 can be connected by a circular arc surface with a predetermined radius of curvature r1. Accordingly, the depth of the indentation of the corner 23' can be suppressed. The occurrence of abnormal sound, because the contact ellipse of the ball 14 rides the shoulder portion and the indentation occurs in the shoulder portions 26, 29, can be prevented.

The wheel bearing apparatus of the present disclosure can be applied to the wheel bearing apparatus of first through fourth generation types irrespective of whether it is used for a driving wheel or a driven wheel.

The present disclosure has been described with reference to the preferred embodiments. Obviously, modifications and alterations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus comprising:
an outer member including an inner circumference integrally formed with double row outer raceway surfaces, each outer raceway surface having a circular arc;
an inner member including an outer circumference with double row inner raceway surfaces, each inner raceway surface having a circular arc and adapted to be arranged opposite to the double row outer raceway surfaces;
two rows of balls are rollably contained between the raceway surfaces, via cages;
a shoulder portion between the outer raceway surfaces, the shoulder portion comprising corners that each include a first relief surface that is on a straight line that is a tangent line of the outer raceway surface, the first relief surface forming a planar surface immediately adjacent the outer raceway surface, a second relief surface that extends from the first relief surface in a straight line shape with a predetermined inclined angle with respect to the first relief surface, and a chamfered portion that is ground in a circular arc with a predetermined radius of curvature (r) having a radius of (r) =(0.15 to 2) ×R, where R is the radius of the outer raceway surface, to increase basic load ratings of the two rows of balls so that the chamfered portion forms a curved surface immediately adjacent the second relief surface and the first relief surface is formed smoothly continuously from each of the outer raceway surfaces; and
the first relief surface with is planar surface prevents a contact ellipse of the balls from overriding the shoulder, a length (h) in only the radial direction of the first relief surface is set greater than or equal to 0.2 mm, the first relief surface, the second relief surface and the chamfered portion forming the corner having a calculated length to increase resistance against generation of indentation of the corner by prohibiting edge loads and shoulder overriding of the contact ellipse of the balls and prevents occurrence of abnormal noise due to the indentation and efficiency is maintained.

2. The wheel bearing apparatus according to claim 1, wherein a shoulder height of the shoulder portion with respect to the ball diameter of the double row of the ball rows is set in a range of 0.35 to 0.50.

3. The wheel bearing apparatus according to claim 2, wherein the shoulder height of the outer raceway surface in a side, where a large moment load is applied, in the double row outer raceway surfaces is set larger than the shoulder height of the outer raceway surface of the other side.

4. The wheel bearing apparatus according to claim 1, wherein a shoulder height, $Ho1$, of the outer raceway surface of an outer-side, when mounted on a vehicle, in the double row outer raceway surfaces with respect to the ball diameter, $do$, of the ball row is set in a range of $Ho1/do=0.40$ to $0.50$, and a shoulder height, $Hi1$, of the outer raceway surface of an inner-side with respect to the ball diameter $di$ of the ball row is set in a range of $Hi1/di=0.35$ to $0.45$.

5. The wheel bearing apparatus according to claim 1, wherein a pitch circle diameter of the ball row of an outer-side, when mounted on a vehicle, in the double row of ball rows is set larger than a pitch circle diameter of the ball row of an inner-side, and a number of balls of the ball row of the outer-side is set greater than a number of balls of the inner-side.

6. The wheel bearing apparatus according to claim 1, wherein the inclined angle of the second relief surface with respect to the first relief surface is set lower than or equal to 10°.

7. The wheel bearing apparatus according to claim 1, wherein a surface roughness of the second relief surface is restricted to lower than or equal to 3.2 Ra.

8. A wheel bearing apparatus comprising:
an outer member including an inner circumference integrally formed with double row outer raceway surfaces, each outer raceway surface having a circular arc;
an inner member including an outer circumference with double row inner raceway surfaces, each inner raceway surface having a circular arc and adapted to be arranged opposite to the double row outer raceway surfaces;
two rows of balls are rollably contained between both raceway surfaces, via cages;
a shoulder portion between the outer raceway surfaces, the shoulder portion comprising corners that include a relief surface that is on a straight line that is a tangent line of the outer raceway surfaces and a chamfered portion that is round in a circular arc with a predetermined radius of curvature; the corner is formed simultaneously by a formed grinding wheel that forms the outer raceway surfaces;
a length in the radial direction of the relief surface is set greater than or equal to 0.2 mm;
a second relief surface extends from the relief surface in a straight line shape with a predetermined inclined angle; and
the relief surface and the second relief surface are connected with a circular arc surface having a predetermined radius of curvature.

9. A wheel bearing apparatus comprising:
an outer member including an inner circumference integrally formed with double row outer raceway surfaces, each outer raceway surface having a circular arc;
an inner member including an outer circumference with double row inner raceway surfaces, each inner raceway surface having a circular arc and adapted to be arranged opposite to the double row outer raceway surfaces;
two rows of balls are rollably contained between both raceway surfaces, via cages;
a shoulder portion between the outer raceway surfaces, the shoulder portion comprising corners that include a relief surface that is on a straight line that is a tangent line of the outer raceway surfaces and a chamfered portion that is round in a circular arc with a predetermined radius of curvature; the corner is formed simultaneously by a formed grinding wheel that forms the outer raceway surfaces;
a length in the radial direction of the relief surface is set greater than or equal to 0.2 mm;
a second relief surface extends from the relief surface in a straight line shape with a predetermined inclined angle;
the relief surface and the second relief surface are connected with a circular arc surface having a predetermined radius of curvature; and
a surface roughness of the circular arc surface is restricted to lower than or equal to 3.2 Ra.

* * * * *

UNITED STATES PATENT AND TRADEMARK OFFICE
CERTIFICATE OF CORRECTION

PATENT NO.        : 9,759,254 B2
APPLICATION NO.   : 13/680235
DATED             : September 12, 2017
INVENTOR(S)       : Kazuo Komori Page 1 of 1

It is certified that error appears in the above-identified patent and that said Letters Patent is hereby corrected as shown below:

In the Specification

Column 11
Line 25              "PCDo>PCDO" should be --PCDo>PCDi--.

In the Claims

Column 12
Line 63, Claim 1     "is" should be --its--.

Signed and Sealed this
Twenty-first Day of November, 2017

Joseph Matal
*Performing the Functions and Duties of the
Under Secretary of Commerce for Intellectual Property and
Director of the United States Patent and Trademark Office*